US010494952B2

(12) United States Patent
Korn et al.

(10) Patent No.: US 10,494,952 B2
(45) Date of Patent: Dec. 3, 2019

(54) TEMPORARY POST MAINTENANCE OIL FILTER FOR GAS-TURBINE ENGINE

(71) Applicant: UNITED TECHNOLOGIES CORPORATION, Farmington, CT (US)

(72) Inventors: Nathan D Korn, Glastonbury, CT (US); Marc Muldoon, Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/242,164

(22) Filed: Jan. 8, 2019

(65) Prior Publication Data

US 2019/0145282 A1    May 16, 2019

Related U.S. Application Data

(62) Division of application No. 14/855,854, filed on Sep. 16, 2015, now Pat. No. 10,208,625.

(Continued)

(51) Int. Cl.
    *F01D 25/20*    (2006.01)
    *F01D 25/18*    (2006.01)
    (Continued)

(52) U.S. Cl.
    CPC ............. *F01D 25/20* (2013.01); *F01D 5/005* (2013.01); *F01D 15/12* (2013.01); *F01D 25/16* (2013.01);
    (Continued)

(58) Field of Classification Search
    CPC .. F01D 5/005; F01D 25/20; F02C 7/06; F02C 7/14; F02C 7/185; F02C 7/224
    See application file for complete search history.

(56) References Cited

U.S. PATENT DOCUMENTS 3,486,582 A * 12/1969 Carter .................... F01D 25/20
                                                    123/196 R
4,854,277 A *  8/1989 Kenney ................. F01M 11/03
                                                    123/196 A (Continued)

FOREIGN PATENT DOCUMENTS

WO    2014133836    9/2014

OTHER PUBLICATIONS

European Patent Office, Extended European Search Report dated Jun. 1, 2016 in European Application No. 15200505.4.

(Continued)

*Primary Examiner* — Michael R Mansen
*Assistant Examiner* — Mark K Buse
(74) *Attorney, Agent, or Firm* — Snell & Wilmer, L.L.P.

(57) ABSTRACT

A method of maintaining a gas-turbine engine is provided. The method includes the steps of removing a conduit from the gas-turbine engine, installing a temporary oil filter in place of the conduit in the gas-turbine engine, and starting the gas-turbine engine with the temporary oil filter installed. A fan-drive gear system is also provided and comprises a journal bearing, a main oil pump fluidly coupled to the journal bearing, a main oil filter fluidly coupled between the journal bearing and the main oil pump, and an auxiliary oil pump fluidly coupled to the journal bearing. The auxiliary oil pump may be configured to supply oil to the journal bearing on startup. An auxiliary oil filter may also be installed between the auxiliary oil pump and the journal bearing.

1 Claim, 5 Drawing Sheets

Related U.S. Application Data

(60) Provisional application No. 62/092,656, filed on Dec. 16, 2014.

(51) Int. Cl.

| | | |
|---|---|---|
| *F01D 25/34* | (2006.01) | |
| *F02C 7/06* | (2006.01) | |
| *F01D 15/12* | (2006.01) | |
| *F01D 25/16* | (2006.01) | |
| *F01D 5/00* | (2006.01) | |
| *F02C 7/14* | (2006.01) | |
| *F02C 7/18* | (2006.01) | |
| *F02C 7/224* | (2006.01) | |

(52) U.S. Cl.
CPC ............ *F01D 25/18* (2013.01); *F01D 25/34* (2013.01); *F02C 7/06* (2013.01); *F02C 7/14* (2013.01); *F02C 7/185* (2013.01); *F02C 7/224* (2013.01); *F05D 2220/32* (2013.01); *F05D 2230/60* (2013.01); *F05D 2230/70* (2013.01); *F05D 2230/72* (2013.01); *F05D 2240/50* (2013.01); *F05D 2260/98* (2013.01); *Y02T 50/671* (2013.01); *Y02T 50/675* (2013.01)

(56) References Cited

U.S. PATENT DOCUMENTS

| | | | | |
|---|---|---|---|---|
| 4,891,934 | A * | 1/1990 | Huelster | F01D 25/20 184/6.11 |
| 5,610,341 | A * | 3/1997 | Tortora | F01D 17/02 73/756 |
| 7,524,416 | B1 * | 4/2009 | Bergmen | B01D 27/08 123/196 A |
| 2006/0096808 | A1 * | 5/2006 | Rosenbaum | F01M 11/04 184/1.5 |
| 2006/0249332 | A1 * | 11/2006 | Bruce | F01D 25/18 184/6.11 |
| 2013/0174575 | A1 | 7/2013 | Ertz et al. | |
| 2013/0213001 | A1 * | 8/2013 | Eickelkamp | F01D 25/20 60/39.08 |
| 2014/0050561 | A1 * | 2/2014 | Homeyer | F01D 25/20 415/1 |
| 2015/0192068 | A1 * | 7/2015 | James | F02C 7/06 60/39.08 |
| 2015/0247460 | A1 * | 9/2015 | Sauerhoefer | F01D 17/02 60/39.08 |
| 2016/0032772 | A1 * | 2/2016 | Sheridan | F01D 25/20 416/171 |

OTHER PUBLICATIONS

USPTO; Notice of Allowance issued in U.S. Appl. No. 14/855,854 dated Oct. 12, 2018.
USPTO; Requirement for Restriction/Election issued in U.S. Appl. No. 14/855,854 dated Jul. 20, 2018.
European Patent Office, European Office Action dated Oct. 25, 2018 in Application No. 15200505.4.
Extended European Search Report dated Jun. 1, 2016 in European Application No. 15200505.4.
United States Patent and Trademark Office; Notice of Allowance issued in U.S. Appl. No. 14/855,854 dated Oct. 12, 2018.
United States Patent and Trademark Office; Requirement for Restriction/Election issued in U.S. Appl. No. 14/855,854 dated Jul. 20, 2018.

\* cited by examiner

TEMPORARY POST MAINTENANCE OIL FILTER FOR GAS-TURBINE ENGINE

CROSS-REFERENCE TO RELATED APPLICATIONS

This application is a divisional application, and claims priority to and the benefit of U.S. Provisional Application No. 62/092,656, entitled "TEMPORARY POST MAINTENANCE OIL FILTER FOR GAS-TURBINE ENGINE," filed on Dec. 16, 2014, and U.S. Non-Provisional application Ser. No. 14/855,854, filed on Sep. 16, 2015, both of which are hereby incorporated by reference in their entirety.

FIELD OF INVENTION

The present disclosure relates to gas-turbine engines, and, more specifically, to a temporary oil filter for a gas-turbine engine.

BACKGROUND

Gas-turbine engines comprise many moving parts. The moving parts often require lubrication in the form of oil. In particular, journal bearings may not function without an oil film and may receive oil before bearings, such as ball bearings, on start up. Contaminants in the oil may cause wear or damage during use. During maintenance, dust and debris may be introduced into the oil system. The amount of particulate introduced into the oil system may be particularly high at facilities that are non-compliant with stringent cleanliness controls. Unfortunately, it would be difficult or impossible to maintain compliance with the cleanliness standards at many service facilities around the world. As a result, particulate count in the oil may be elevated along with the risk of engine damage after maintenance. With newer engines, the cleanliness standards are higher than those associated with older engines. Thus, the ability to maintain these engines may be severely limited without stringent environmental controls.

SUMMARY

A method of maintaining a gas-turbine engine is provided. The method includes the steps of removing a conduit from the gas-turbine engine, installing a temporary oil filter in place of the conduit in the gas-turbine engine, and starting the gas-turbine engine with the temporary oil filter installed.

In various embodiments, the method may also comprise stopping the gas-turbine engine with the temporary oil filter installed, removing the temporary oil filter after starting and stopping the gas-turbine engine, and/or reinstalling the conduit in place of the temporary oil filter in the gas-turbine engine. The temporary oil filter may be installed between an auxiliary oil pump and a fan-drive gear system. The method may also include removing a single panel to provide access to the conduit. A retention hardware may be decoupled from the conduit and coupled to the temporary oil filter. The interface with a journal supply line may be decoupled from the conduit and coupled to the oil filter. The gas-turbine engine may be run for at least a predetermined duration with the temporary oil filter installed.

A method of maintaining a gas-turbine engine is also provided comprising installing an oil filter in the gas-turbine engine, starting the gas-turbine engine with the oil filter installed, stopping the gas-turbine engine with the oil filter installed, removing the oil filter, and installing a conduit in place of the oil filter.

In various embodiments the method may include removing the conduit from the gas-turbine engine before to installing the oil filter. The oil filter may be installed in place of the conduit. The method may further include removing a single panel to provide access to the conduit. The oil filter may be installed between an auxiliary oil pump and a fan-drive gear system. The method may also comprise decoupling a retention hardware from the oil filter, coupling the retention hardware to the conduit, decoupling the oil filter from an interface with a journal supply line, and/or coupling the conduit to the interface with the journal supply line. The gas-turbine engine may be run for at least a predetermined duration with the oil filter installed. The conduit may be substantially unobstructed.

A fan-drive gear system is also provided and comprises a journal bearing, a main oil pump fluidly coupled to the journal bearing, a main oil filter fluidly coupled between the journal bearing and the main oil pump, and an auxiliary oil pump fluidly coupled to the journal bearing. The auxiliary oil pump may be configured to supply oil to the journal bearing on startup. An auxiliary oil filter may also be installed between the auxiliary oil pump and the journal bearing. A substantially unobstructed conduit may be configured to replace the auxiliary oil filter.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
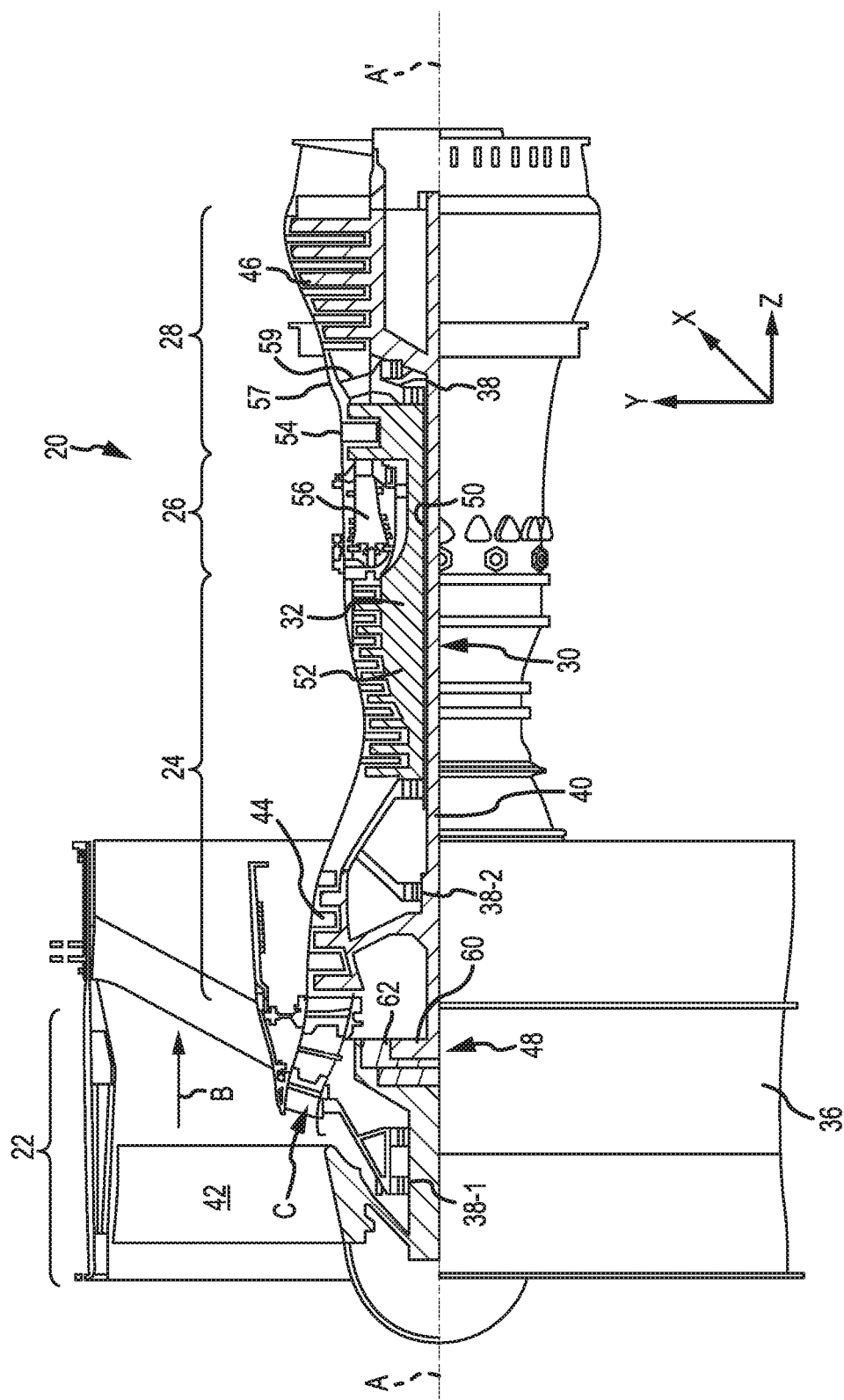
FIG. 1 illustrates an exemplary gas-turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure (or first) compressor section 44 and a low-pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. Gear assembly 60 may require lubrication and have very stringent cleanliness controls. For example, gear assembly 60 may include one or more journal bearings that require oil lubrication to function properly.

High speed spool 32 may comprise an outer shaft 50 that interconnects a high-pressure (or second) compressor 52 and high-pressure (or second) turbine 54. A combustor 56 may be located between high-pressure compressor 52 and high-pressure turbine 54. A mid-turbine frame 57 of engine static structure 36 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor section 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor section 44, and the low-pressure turbine 46 may have a pressure ratio that is greater than about five (5:1). Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
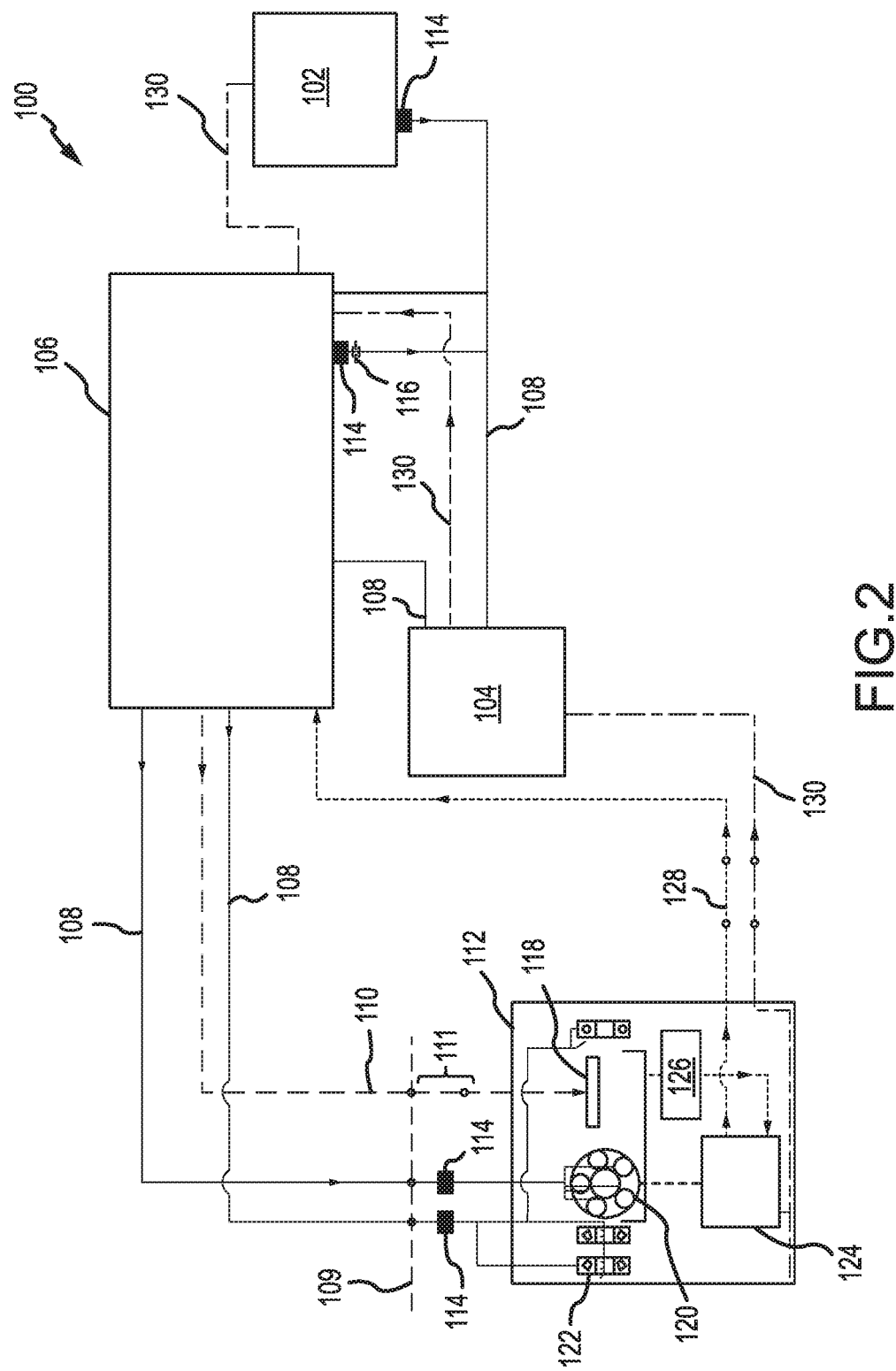
FIG. 2 illustrates a schematic view of an oil system, in accordance with various embodiments.

With reference to FIG. 2, a partial schematic of an oil system 100 is shown, in accordance with various embodiments. Oil system 100 includes oil tank 102 fluidly coupled to main oil pump 104 through line-supply conduit 108. Line-supply conduit 108 may be pipe and/or tubing configured to carry oil. Main oil pump 104 may also be fluidly coupled to an oil control module 106 through one or more line-supply conduit 108 as well as through scavenge-return line 130. Scavenge-return line 130 may be a pipe and/or conduit configured to carry oil. Last chance screens 114 and/or chip collector 116 may be fluidly coupled to line-supply conduits 108 to catch any large particulate in oil system 100. Oil control module 106 may include a main oil filter. In that regard, oil control module may provide filtered oil during normal operation of a gas-turbine engine. Scavenge-return lines 130 may return oil to main oil pump 104, through oil control module 106, and/or to oil tank 102.

In various embodiments, oil control module may provide oil to a fan-drive gear system 112 including gear teeth 120, bearings 122, and journal bearings 118. Fan-drive gear system 112 may be a gearing mechanism such as geared architecture 48 of FIG. 1. Line-supply conduits 108 may carry oil from oil control module 106 to fan-drive gear system 112 during normal operation. A portion of the oil from journal bearings 118, gear teeth 120, and bearings 122 may supply auxiliary tank 126 with oil. Auxiliary pump 124 may be fluidly coupled with auxiliary tank 126 and pump oil from auxiliary tank 126 back through oil control module 106 by way of auxiliary circuit conduits 128. During startup, oil control module 106 may send the oil from auxiliary pump 124, through journal-supply line 110 including conduit 111, and into journal bearings 118.

In various embodiments, the oil in the auxiliary circuit during startup may not pass through an oil filter during normal operation. During day to day operation, the oil passing from auxiliary pump 124 and auxiliary tank 126 to journal bearings 118 (i.e., in the auxiliary circuit of oil system 100) may not pose a threat to journal bearings because the oil has been running through the main oil circuit of oil system 100 (and thus has been filtered during prior engine running time). However, during maintenance or assembly, debris may be introduced to the oil system. In that regard, journal bearings may be vulnerable to the unfiltered oil in the auxiliary circuit of oil system 100 during the first start up after maintenance or assembly.

Figure 3A:
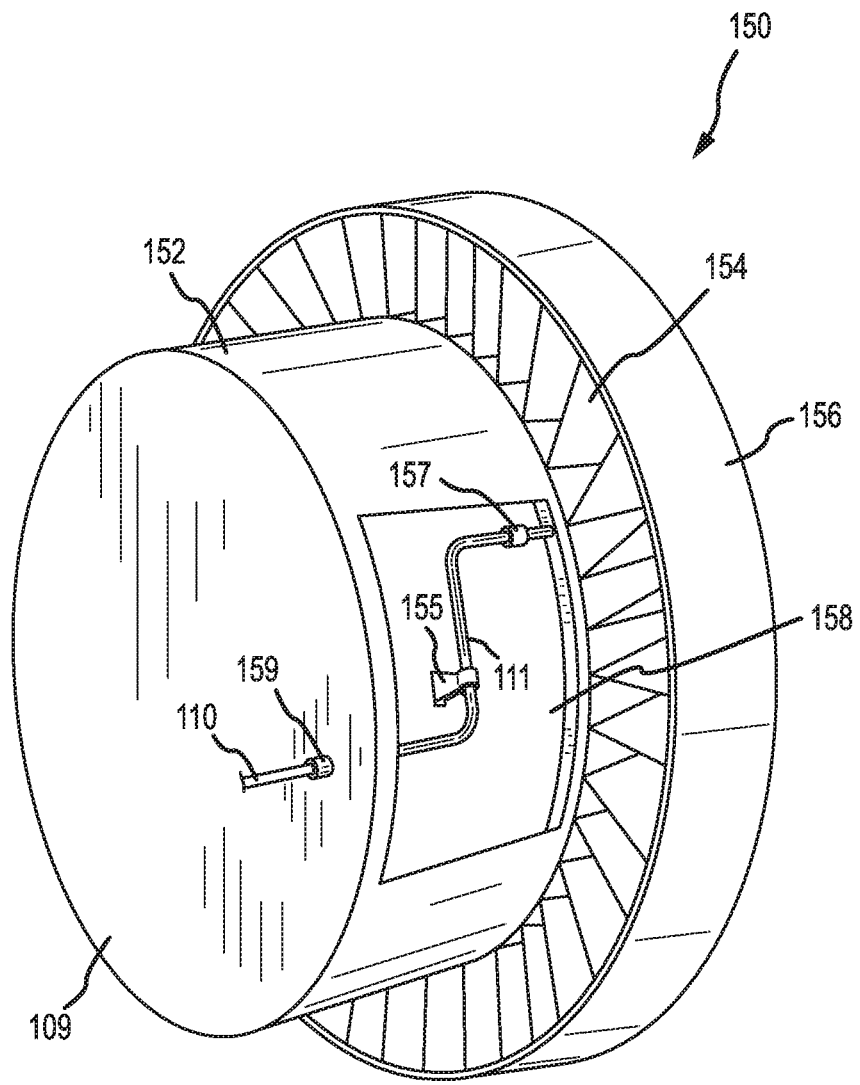
FIG. 3A illustrates a fan of a gas-turbine engine having an un-filtered oil pipe installed for in-flight use, in accordance with various embodiments.

With reference to FIG. 3A, fan section 150 of a gas-turbine engine is shown with conduit 111 in place, in accordance with various embodiments. Although conduit 111 is shown in a single location, conduit may be located at any point in the oil system. Fan section 150 may include housing 152 aft of fan 154 and shroud 156. Conduit 111 may be in compartment 158 of housing 152. Compartment 158 may be readily accessible by removing a single panel or multiple panels, for example. Panels may be used to provide warning that a temporary oil filter is installed. For example, oil filter 160 may interfere with installation of the flight panel, which used during normal operation of an aircraft with conduit 111 installed. A testing panel may be used to cover oil filter 160 during testing or a post maintenance run, with the testing panel having distinct visual indicators such as prominent markings and bright coloring. The testing panel may tend to prevent an engine being released for flight with oil filter 160 installed.

In various embodiments, conduit 111 may couple with journal-supply line 110 using interface 159 at firewall 109 and interface 157 forward of firewall 109. Retention hardware 155 may provide support for conduit 111 and fix conduit 111 in place relative to housing 152. Conduit 111 may be in place during normal operation and flight of an aircraft. Conduit 111 may be a substantially unobstructed (e.g., without an oil filter) tube, pipe, or other conduit.

Figure 3B:
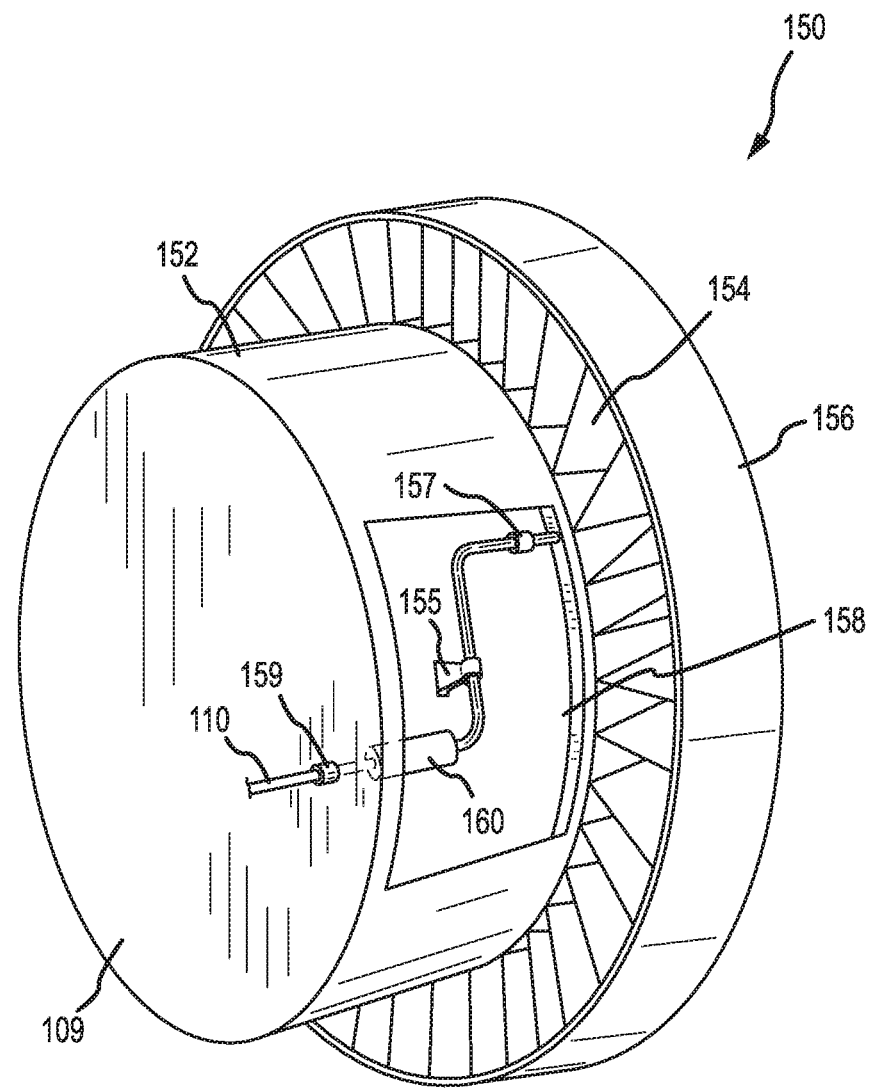
FIG. 3B illustrates a fan of a gas-turbine engine having a temporary oil filter installed for post-maintenance startup, in accordance with various embodiments.

With reference to FIG. 3B and continuing reference to FIG. 3A, fan section 150 of a gas-turbine engine is shown with oil filter 160 installed in place of conduit 111, in accordance with various embodiments. Although oil filter 160 is shown in a single location, the oil filter may be located at any point in the oil system. In response to maintenance performed, conduit 111 may be removed from fan section 150. Any oil in the oil system may be removed prior to removing conduit 111 and/or prior to removing oil filter 160. In that regard, oil filter 160 may include a plug or other mechanism to drain any oil in the oil system before the filter assembly is removed.

In various embodiments, oil filter 160 may be installed in place of conduit 111. Oil filter 160 may be a temporary oil filter that is not normally used during flight (because conduit 111 may be installed during flight). Oil filter 160 may be configured to use interface 159 and interface 157 to couple with journal-supply line 110. Oil filter 160 may also be configured to fit retention hardware 155. In that regard, oil filter 160 may be interchangeable with conduit 111 of FIG. 3A in terms of mounting points and interfaces with other conduits.

In various embodiments, oil filter 160 may be temporarily installed after maintenance or assembly by removing conduit 111 from the gas-turbine engine. Oil filter 160 may be temporarily installed in place of conduit 111 in the gas-turbine engine. The engine may be started with auxiliary pump 124 of FIG. 2 passing oil through oil filter 160 that is installed between an auxiliary pump 124 and a fan-drive gear system 112 (both shown in FIG. 1). This may be the first post-maintenance or assembly startup. The gas-turbine engine may then by started with oil filter 160 temporarily installed. Auxiliary pump 124 may pump oil through oil filter 160 to journal bearings 118. The oil may thus be filtered by (temporary) oil filter 160. The engine may be run for any predetermined minimum duration (e.g., 10 minutes) to ensure any harmful debris introduced during maintenance is captured by a filter. The test run may also extend until satisfied that the engine is ready to be released for flight. In that regard, oil filter 160 is installed for the post-maintenance test run program (also referred to as a green run). The gas-turbine engine may be stopped after the first post-maintenance startup. Oil filter 160 may then be removed or otherwise uninstalled from the gas-turbine engine. Conduit 111 may be reinstalled in place of oil filter 160.

Figure 4:
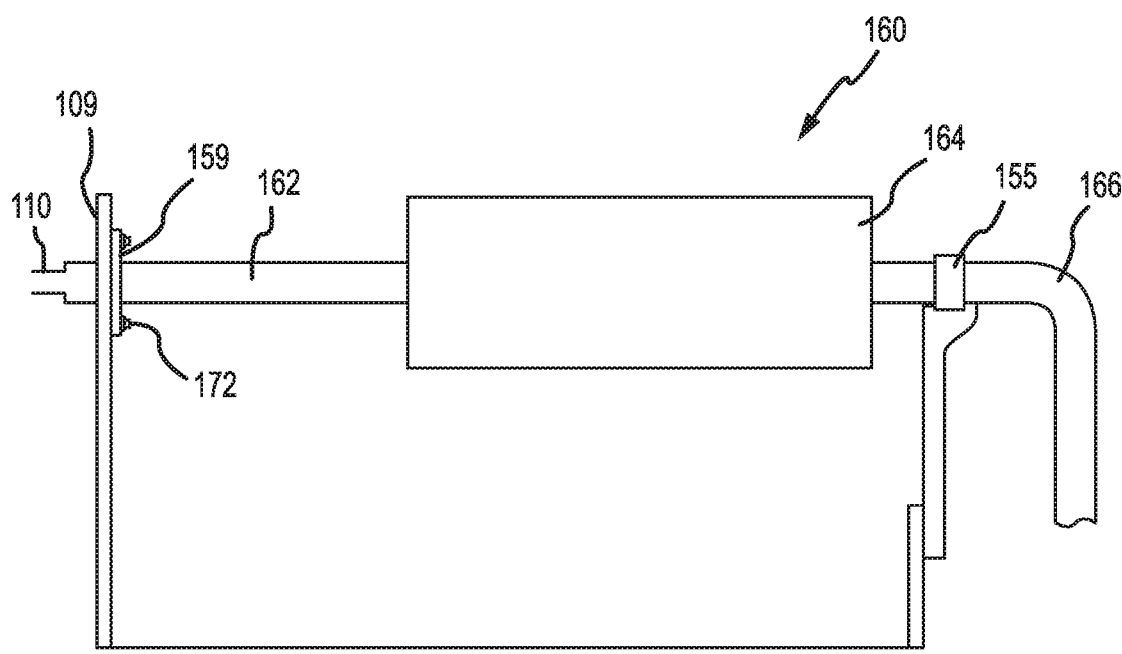
FIG. 4 illustrates a temporary oil filter installed in a gas-turbine engine, in accordance with various embodiments.

With reference to FIG. 4 and continuing reference to FIG. 3A, oil filter 160 is shown installed in a gas turbine engine, in accordance with various embodiments. Interface 159 may couple journal-supply line 110 with oil filter 160 so that oil filter 160 is in fluid communication with journal-supply line 110. Interface 159 may be the same interface that couples conduit 111 to journal-supply line 110 while conduit 111 is installed. Oil filter 160 may also be supported and/or retained by retention hardware 155. Retention hardware 155 may be the same hardware that retains and/or supports conduit 111 while conduit 111 is installed. In that regard, oil filter 160 may be installed using the same fittings as conduit 111. Fasteners 172 may hold oil filter 160 in place. Oil filter 160 may comprise conduit 162, body 164, and conduit 166 configured to filter oil entering journal bearings 118.

By using a temporary oil filter during the initial start-up after maintenance or assembly, a second permanent oil filter located between the auxiliary pump and fan drive gear system is not necessary. Eliminating a permanent oil filter can save weight on an aircraft as well as the cost of regularly replacing a secondary oil filter. Since the oil in the oil system is filtered during normal operation there is limited danger of contaminated oil until the system is opened at maintenance or assembly. Oil filter 160 temporarily installed in place of conduit 111 during the initial post-maintenance startup may protect fan-drive gear system 112 from oil that may be contaminated during maintenance.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan-drive gear system for a gas turbine engine, comprising:
    a journal bearing;
    a main oil pump fluidly coupled to the journal bearing via a journal supply line and a conduit disposed between the journal supply line and the journal bearing;
    an auxiliary oil pump fluidly coupled to the journal bearing, wherein the auxiliary oil pump is configured to supply oil to the journal bearing on startup; and
    a temporary oil filter, interchangeable with the conduit, configured for temporary installation in place of the conduit and to supply oil to the journal bearing from the auxiliary oil pump upon startup of the gas turbine engine following a maintenance procedure.

* * * * *